United States Patent [19]

Hancock et al.

[11] Patent Number: 5,453,787
[45] Date of Patent: Sep. 26, 1995

[54] VARIABLE SPATIAL FREQUENCY CHROMINANCE ENCODING IN SOFTWARE MOTION VIDEO COMPRESSION

[75] Inventors: Steven M. Hancock; Mark A. Pietras, both of Boca Raton, Fla.

[73] Assignee: International Business Machines Corporation, Armonk, N.Y.

[21] Appl. No.: 165,372

[22] Filed: Dec. 10, 1993

[51] Int. Cl.⁶ .................. H04N 7/26; H04N 7/66
[52] U.S. Cl. .............. 348/391; 348/409; 348/412; 348/421; 348/415
[58] Field of Search ................ 348/391, 396, 348/399, 420, 408, 421, 416, 412, 409

[56] References Cited

U.S. PATENT DOCUMENTS

| | | | |
|---|---|---|---|
| 4,710,801 | 12/1987 | Kunzinger | 348/391 |
| 4,743,959 | 5/1988 | Frederiksen | 348/408 |
| 4,751,572 | 6/1988 | Baumbaugh et al. | 348/399 |
| 4,758,881 | 7/1988 | Laspada | 348/420 |
| 4,764,805 | 8/1988 | Rabbani et al. | 348/396 |
| 4,774,562 | 9/1988 | Chen et al. | 348/391 |
| 4,797,729 | 1/1989 | Tsai | 348/391 |
| 4,797,741 | 1/1989 | Sato et al. | 348/399 |
| 4,803,548 | 2/1989 | Kirk . | |
| 4,914,508 | 4/1990 | Music et al. . | |
| 4,918,523 | 4/1990 | Simon et al. . | |
| 4,924,310 | 5/1990 | von Brandt . | |
| 4,933,761 | 6/1990 | Murakami et al. . | |
| 4,982,270 | 1/1991 | Tanaka et al. | 348/396 |
| 5,045,925 | 9/1991 | Saito . | |
| 5,093,872 | 3/1992 | Tutt | 348/391 |
| 5,121,191 | 6/1992 | Cassereau et al. . | |
| 5,162,907 | 11/1992 | Keating et al. . | |
| 5,185,655 | 2/1993 | Wakeland | 348/391 |
| 5,220,410 | 7/1993 | Wakeland et al. | 348/391 |
| 5,225,904 | 7/1993 | Golin et al. | 348/412 |
| 5,253,041 | 10/1993 | Wine et al. | 348/421 |
| 5,343,539 | 8/1994 | Chan | 348/408 |

FOREIGN PATENT DOCUMENTS 62-143584 6/1987 Japan .

OTHER PUBLICATIONS

Television Engineering Handbook, K. Blair Benson, pp. 19.11–19.12, McGraw–Hill Book Company.

Primary Examiner—Tommy P. Chin
Assistant Examiner—Anand S. Rao
Attorney, Agent, or Firm—Bruce D. Jobse; Paul E. Kudirka

[57] ABSTRACT

An image-compression/decompression system employs a variable spatial-frequency encoder to encode the chrominance information contained within a video image. The system divides the video image into non-overlapping regions and partitions each region into sub-regions. Within each region, the system computes a weighted average of the chrominance values in each sub-region, and compares the weighted average value associated with each sub-region to the weighted average values associated with the other sub-regions within the region. If differences between the average values are less than a predetermined threshold amount, the system assigns a single chrominance encoded value to the entire region. If, on the other hand, the differences between the weighted average values is more than the predetermined threshold amount, the system assigns individual chrominance values to each of the sub-regions.

13 Claims, 4 Drawing Sheets

VARIABLE SPATIAL FREQUENCY CHROMINANCE ENCODING IN SOFTWARE MOTION VIDEO COMPRESSION

FIELD OF THE INVENTION

This invention relates generally to systems for reducing the amount of digital data required to represent color digital video images. More specifically, it relates to systems for reducing the amount of digital data required to represent color digital video images by compressing the color-difference component of a color digital video image. By compressing the images, these systems facilitate transmission, recording, and reproduction of video signals.

BACKGROUND OF THE INVENTION

The storage and transmission of full-color, full-motion images is increasingly in demand. These images are used, not only for entertainment, as in motion pictures or television shows, but also for complicated analytical and diagnostic tasks such as engineering analysis and medical imaging.

There are several advantages to providing these images in digital form. The images are more susceptible to enhancement and manipulation and they are more readily indexed for storage and retrieval. As with all digital representations, digital video images can be regenerated exactly. Additionally, computer and television technologies are on the threshold of merging. Both fields will benefit from the resulting synergies, but in order to take full advantage of this merger, television will shift to the digital technology which dominates computer technology. Many of the advantages of digital television and commonly used data compression techniques are discussed in chapters 18 and 19 of a reference entitled "Television Engineering Handbook", K. Blair Benson, Editor in Chief, McGraw-Hill Book Company, 1986 which is hereby incorporated by reference.

There are two major problems associated with the use of digital images; they require an immense amount of memory for storage and they consume tremendous channel bandwidth when they are transmitted. For example, a single 512 by 512 pixel gray-scale image with 256 gray levels requires greater than 256,000 bytes of storage. A full color image requires nearly 800,000 bytes. Natural-looking motion requires that images be updated at least 30 times per second. The transmission channel for natural-looking full color moving images must therefore accommodate approximately 190 million bits per second. One minute of full color video requires almost 2 Gigabytes of storage.

As a result of the increasing demand for color digital video images and because of the huge potential cost savings, many image compression techniques have been employed to reduce both the transmission bandwidth and storage area required by digital video signals. These techniques generally take advantage of the fact that there is a great deal of redundancy in any natural image and, fortunately, the human psycho-visual system does not respond to abrupt time-based or spatial transitions. This permits the use of both time-domain and spatial-domain techniques to reduce the amount of data used to transmit, record, and reproduce color digital video images.

For example, differential pulse-code modulation (DPCM) is a commonly used compression technique which relies upon the facts that video images, generally, are quite redundant and that any transitions in the images are, for the most part, gradual. A DPCM encoder will therefore predict upcoming pixel values based upon previous pixel values then compare the actual value with the predicted value to obtain an error signal. The error signal is the encoded value. If the predictions are relatively accurate, the error signal will occupy a great deal less memory and/or bandwidth than the original video signal. The signal can be decoded by using the prediction algorithm in conjunction with the error signal.

Other compression techniques further rely upon the fact that the human psycho-visual system is less sensitive to changes in chrominance than to changes in luminance. In one exemplary embodiment these systems undersample the chrominance information in a video signal by dividing the image into an array of n-pixel by n-pixel squares and assigning a single chrominance value to each of the squares. This reduces the chrominance information that must be stored or transmitted by a factor of n-squared.

Unfortunately, few natural images are composed of square chrominance regions and the size of the squares used in undersampling the chrominance information must be kept small in order to prevent "bleeding" of color from region to region. Bleeding is especially common in those areas of an image which exhibit the greatest spatial color variation. As a result, those regions tend to set the lower bound on the chrominance sampling frequency which may be employed for the image. But setting the sampling frequency high enough to preclude bleeding even in the areas of greatest spatial color variation reduces the compression ratio that may be obtained.

It is therefore an object of the invention to improve the image quality of compressed color video images, specifically, to reduce the amount of "bleeding" attributable to a chrominance-compression system, and to increase the compression of the images.

SUMMARY OF THE INVENTION

The invention employs a variable spatial-frequency chrominance encoder to selectively compress the chrominance information of color video images. The encoder selects the chrominance-sampling frequency depending upon the degree of chrominance variation within a large test region. The chrominance values within the test region are systematically sampled and the samples are compared to each other. If the sample values within the test region differ by more than a predetermined threshold amount, the encoder assigns separate encoded chrominance values to separate portions of the test region. Alternatively, if the sample values within the test region differ by less than the threshold amount, the encoder assigns a single encoded chrominance value to the entire test region.

More particularly, one embodiment of the invention divides a video image into non-overlapping regions and partitions each of these regions into sub-regions. It then computes a sample value, which is, illustratively, the weighted average of the chrominance values within each subregion, and compares the sample value of each sub-region to that of all the other sub-regions within the region. If the sample values are within a predetermined range of each other, it assigns an identical encoded chrominance value, which may be the average of the sample values, to each of the sub-regions. If the sample values differ by an amount greater than the predetermined range, each of the sub-regions is assigned an individual encoded chrominance value, which may illustratively be the sample value for that sub-region. The predetermined range can be set by balancing the competing demands of a desired compression ratio and image quality.

In accordance with another embodiment of the invention, one which may be used in conjunction with the embodiment just described, a data stream containing the chrominance values can be streamlined by using escape commands, or flags, within the stream to indicate the sampling frequency employed for a region. An image can then be decoded from the stream using the flags to determine to which regions the stored chrominance values should be assigned.

The invention can thus reduce chrominance artifacts which could appear if a single, low spatial-sampling-frequency were used. The invention can concurrently provide more extensive image compression than would result if a single, high spatial-sampling-frequency were employed.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
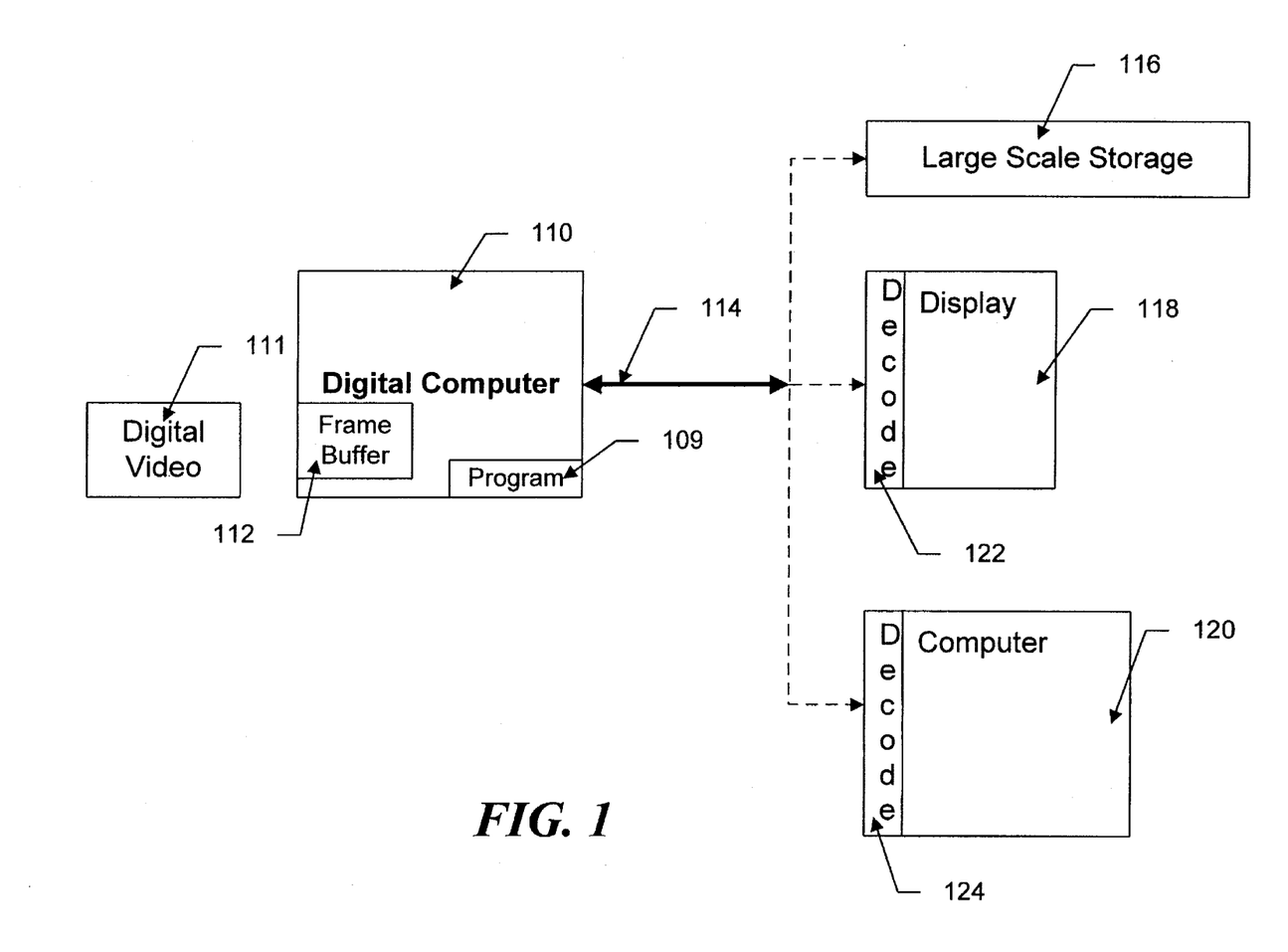
FIG. 1 is a block diagram of a computer environment suitable for practicing an embodiment of the invention.

The computer 110, of FIG. 1 is a general purpose, digital computer. It comprises ALU, registers, serial and parallel interfaces, program storage and an operating system. The computer operates under control of an applications program 109 which directs it to, inter alia, encode the digital video information stored in a frame buffer 112 and to transfer the encoded information through a communication path 114 to other devices.

The frame buffer 112, which may be physically located within the computer 110, stores a digitized video image which is represented in a luminance, chrominance format provided by digital video source 111. The computer 110 has random access to the information stored in the frame buffer 112.

Other devices with which the computer 110 communicates may include a large-scale storage device 116, a display 118, or another computer 120. The communication path 114 may be serial or parallel, or it may actually comprise a plurality of paths which accommodate communications with various devices. The digital-video related information transferred along the path 114 is encoded information. Therefore the transmission path 114 may be of a lower bandwidth capacity than would be required if the video information were not encoded. Further, the large-scale storage device 116 may be of lower capacity than would be required for non-encoded video information storage. The display 118, which receives the encoded video information, employs a decoder 122 to convert the encoded video information into a format for display. Similarly, the computer 120 may employ a decoder 124 to convert the video information into a format for display.

In operation, the computer 110, under control of the program 109, operates upon the video information stored in the frame buffer 112 to reduce both the quantity of storage space required to store a video frame and to reduce the channel-bandwidth required to transmit video images.

Figure 2:
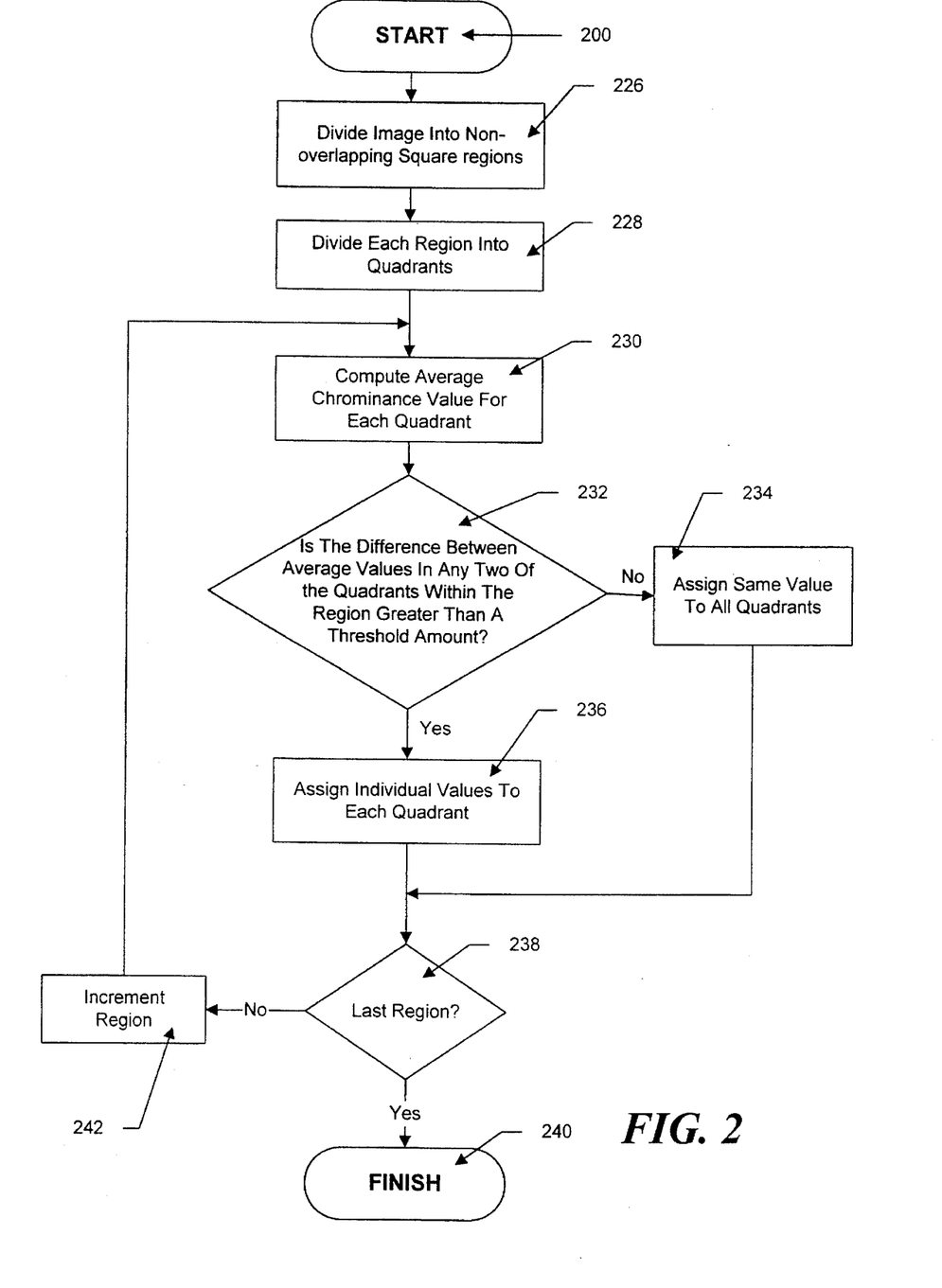
FIG. 2 is a flow chart which illustrates the operation of the embodiment illustrated in FIG. 1.

The flow chart of FIG. 2 discloses generally the operation of an illustrative chrominance encoder which can be effected by the computer 110 under control of the program 109 or may be effected by special purpose hardware. Operation begins at step 200 and proceeds to step 226 where the image stored within the frame buffer 112 is divided into non-overlapping regions. Illustratively, square, contiguous regions are used, but non-contiguous regions and regions of shapes other than square may also be used. More particularly, in accordance with a conventional frame buffer operation, the digital image may be stored as a multi-slot array, each slot of which corresponds to a picture element (pixel) to be displayed. Each array slot stores a byte (eight bits). Each byte, in turn, is divided into two four-bit nybles and a nyble is assigned to encode one of the chrominance signals, I and Q (color and saturation), associated with the pixel. Other chrominance representations may be employed; each chrominance signal pair, I and Q, may have two bytes assigned, for example.

Computer 110 divides the stored image into regions by selecting appropriate array slots which correspond to several contiguous pixels. In accordance with one embodiment, when the computer 110 divides the image into regions, each region may be a square region of eight pixels by eight pixels, each pixel having a byte of chrominance information associated with it.

At step 228, the computer 110 further divides each region into sub-regions which may illustratively be quadrants. In the case of eight-pixel by eight-pixel regions, each quadrant, then, would be a four-pixel by four-pixel image area. After dividing the regions into quadrants, the computer 110 proceeds, at step 230, to compute average chrominance sample values for each quadrant. The computer then compares, at step 232, the average chrominance sample value for each of the quadrants to that of each of the other quadrants, computing the difference of the chrominance values for each quadrant pair.

If all of the quadrant pair differences are less than a predetermined threshold amount, the computer 110, at step 234, assigns the same chrominance encoded value to all the quadrants within the region. If the average chrominance sample values for any two quadrants differ by more than the predetermined threshold amount, the computer 110, as shown at step 236, assigns individual chrominance encoded values to each of the quadrants. After either step 234 or 236, the computer 110 determines, at step 238, whether the region just operated on is the last region of the image. If it is, the computer, having compressed an entire image, proceeds to step 240 and finishes. If there are other regions within the image which have yet to be processed, the computer 110 moves on, at step 242, to the next region and proceeds as before to assign chrominance values to regions until the entire image is compressed in this fashion.

To aid in a further understanding of the invention, a more detailed description of the operation of one embodiment of the invention will be set forth in connection with FIG. 3 which depicts a portion of an exemplary video display 300. In operation, the invention may divide the display 300 into eight-pixel by eight-pixel regions 301, 302, 303, 304, 305, 306, 308 and 310. This division is schematically represented by heavy lines. In reality, of course, these heavy lines would not appear on the image, instead, the division would be carried out by selecting appropriate ones of pre-stored pixel chrominance values to create the regions. Alternatively, in the case of a data stream, the regions could be created by delaying an incoming stream of pixel chrominance values by a time delay sufficient to make pixel values from a previous scan line available and then selecting appropriate pixel values to create the regions. The particular portion 300 of the video display comprises, in general, a background color with several regions of differing colors. The background color is represented by the color of regions 301, 302, 304 and 310. Regions 303, 305, 306 and 308 contain areas which vary in color from the background regions 301, 302, 304 and 310.

In accordance with the principles of the invention, these regions are further divided into four-pixel by four-pixel sub-regions, or quadrants. For example, region 301 may be divided into quadrants, 301a, 301b, 301c, 301d; region 302 may be divided into quadrants 302a, 302b, 302c and 302d, etc.

After dividing the display into regions and sub-regions, the invention then computes sample values corresponding to average chrominance values for each of the quadrants, 301a, 301b, 301c, 301d, 302a, etc. The sample value or average chrominance value for each of the quadrants within a region is then compared to the average chrominance value for each of the other quadrants within the region. For example, for region 301, the sample value of the quadrant 301a is compared to that of 301b, 301c, and 301d. Similarly, the sample value of quadrant 301b is compared to sample values for quadrants 301c and 301d; and the value computed for quadrant 301c is compared to the value for quadrant 301d. If the result of these comparisons, is that none of the quadrant sample values 301a–301d vary from any other quadrant sample values 301a–301d by more than a threshold amount, the entire region 301 is assigned a single chrominance encoded value. This value may be, for example, the average of the chrominance values within region 301 or the average of the sample values for quadrants 301a–301d. Each region of the display, 301, 302, 303 etc. is assigned chrominance values in this manner.

Figure 3:
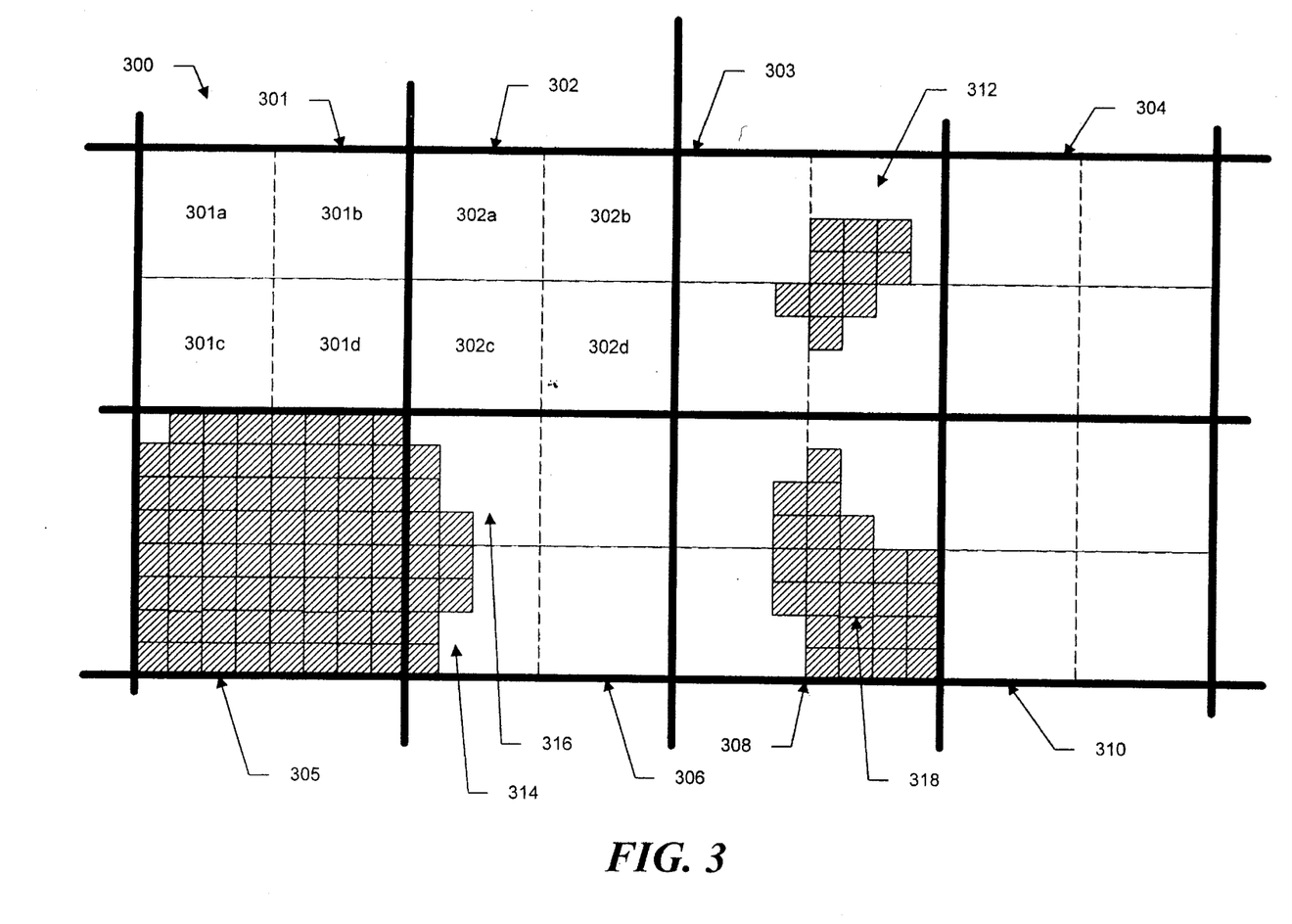
FIG. 3 illustrates the division of a portion of a video image into regions and sub-regions.

In the particular display illustrated in FIG. 3, the regions 301, 302, 304, 305 and 310, because of their relatively uniform chrominance, would be assigned a single chrominance encoded value. The regions 303, 306 and 308, because of the variation in color represented by areas 312, 314, 316, and 318, would each have four chrominance encoded values assigned (one for each quadrant).

The data compression achieved by the invention is apparent when one considers, for example, an eight-pixel by eight-pixel region which, because of the similarity of chrominance values, is assigned a single chrominance encoded value for the entire region. The chrominance information for the region would then occupy one byte, instead of the sixty-four bytes that would be required in the absence of compression. On the other hand, if a region has within it widely varying chrominance values (the region is part of a colorful scene), assigning one chrominance encoded value to the entire region may yield a displayed image which would be perceived by a human observer as one where the colors of one region intrude upon ("bleed into") an adjacent region. In this case, individual chrominance encoded values are assigned to each quadrant of the region. The invention thus compresses chrominance information in those regions of an image where the compression will not perceptibly degrade the image, but it may not compress the particularly colorful image regions. The overall effect is to vary the spatial encoding frequency between those regions which are assigned a single chrominance encoded value and those regions which are assigned individual chrominance encoded values for each subregion.

The advantages of the variable frequency encoding also extend to data stream compression. More particularly, in accordance with conventional chrominance encoding, the data stream associated with the chrominance information of an uncompressed 512 by 512 image may consist, primarily, of a quarter of a megabyte of chrominance values, with a single byte corresponding to each pixel location. Four bits of each byte, for example, are allotted for one of the color difference values, I and Q of the pixel.

However, the data stream associated with the chrominance information of an image compressed according to the present invention may, on the other hand consist primarily of escape flags which indicate the frequency of sampling used for a region, followed by the chrominance value assigned to the corresponding region. The escape command, basically, indicates to a decoder the number of pixels (sixteen or sixty four in the present example) which should be assigned the chrominance value associated with the escape command.

Additionally, the storage and transmission overhead associated with data stream escape commands may be reduced in a variety of ways. For example, an image area characterized by clusters of colorful regions may be encoded using a toggle command. That is, when a first command is encountered, it indicates that the following region is a region where high spatial frequency sampling has been employed and, each of the following chrominance values is associated with an individual quadrant. When the next flag is encountered, it indicates that the following regions have been sampled using a low frequency spatial sampling and, therefore, each of the following chrominance values is associated with an entire region (all four quadrants receive the identical chrominance value).

On the other hand, if the colorful area is simply an isolated area of color change, an escape command is used which indicates that high spatial frequency sampling was employed for only the following region and, therefore, the following four chrominance values are to be assigned to each of the quadrants of that region. After decoding those four chrominance values, the following chrominance values are assigned on the basis of the default assumption of low spatial frequency sampling i.e., one chrominance value is assigned to an entire region.

Figure 4:
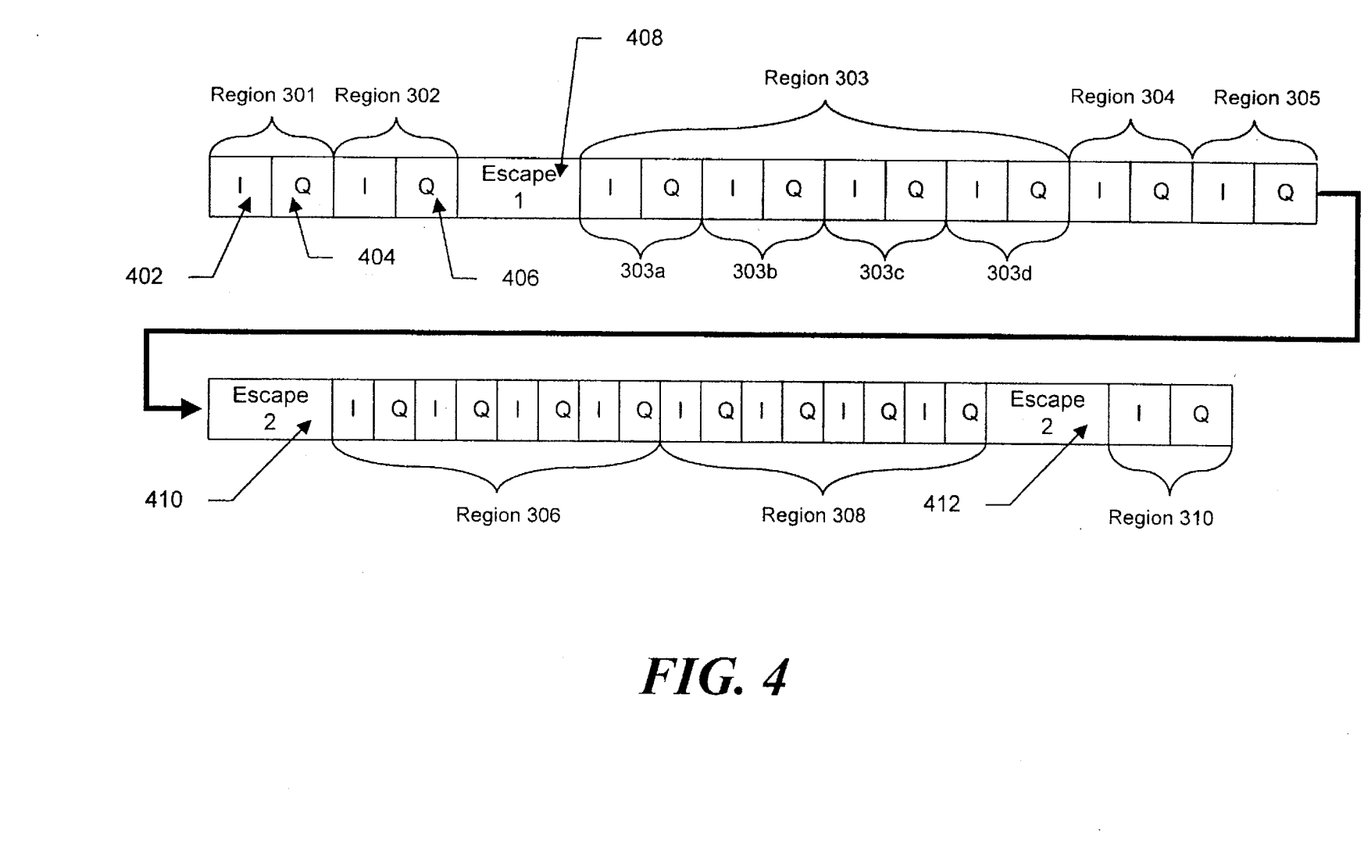
FIG. 4 illustrates a data stream associated with the image of FIG. 3.

An illustrative data stream associated with the regions depicted in FIG. 3 is illustrated in FIG. 4. Beginning with the region 301, the first two regions, because they are relatively uniform in color and are therefore chrominance-sampled at a low frequency, have, by way of example, two nybles—four bits each for I and Q values, such as nybles 402—and 404 assigned to represent their chrominance value.

The byte 408 following nyble 406 containing the Q value for the region 302 contains an "escape 1" command. This command which is inserted by the encoder during the encoding process, indicates to a decoder that the following four bytes, 303a–303d, are the chrominance values assigned to each quadrant within the next region (the region 303 in this case). The region 303 is chrominance-sampled at a high frequency, as noted above, because the area 312 represents an area of color that causes the average chrominance values of at least two of the quadrants within region 303 to vary by more than the predetermined threshold amount.

The four bytes assigned to the region 303 are followed by two bytes which contain the chrominance values for the regions 304 and 305. Following the byte containing the chrominance value for the region 305 is an "escape 2" command 410. This command indicates that all subsequent data is to be assigned on a "high frequency", that is, four chrominance values per region basis, until another "escape 2" value is encountered. Following the first "escape 2" command 410 are eight bytes which contain chrominance information for the regions 306 and 308. After the last byte containing chrominance information for the region 308, another "escape 2" command 412 is encountered. This second "escape 2" command 412 indicates that subsequent chrominance information is encoded on a low frequency basis. Therefore, the following byte represents all the chrominance information for the region 310.

When encoding an image, the choice of a threshold range value is based upon a compromise between the competing requirements of compression ratio and image quality. The human psychovisual system is limited in its ability to perceive spatial variations in chrominance. Ideally, the threshold range used to determine whether neighboring quadrants are "close enough" in chrominance values to permit the use of a single chrominance value for an entire region is set by assigning a threshold range value which yields individual chrominance values for each quadrant whenever the region being compressed contains variations in color which could be perceived by a human observer. If this threshold range value yields an acceptable compression ratio, this is the range value used. However, if this range value does not yield an acceptable ratio, the value may be increased in order to achieve the required compression ratio.

In operation, various ranges may be made available to a technician who experiments with ranges to select one which provides both the necessary image quality and data compression. An initial value of the threshold range may be set, for example, midway between the narrowest range which yields maximum compression and the widest range which yields imperceptible compression. The technician then views the image and may then change the chrominance range to improve the image quality. After this initial range-selection, the encoding process may take place autonomously either in real-time or off-line.

Additionally, when comparing the average chrominance values among sub-regions within a region, the chrominance values may be weighted in different ways, depending upon the particular application. In some cases, a weighting value of "one" has been found to produce the best results. In other cases, correlating the weighting with the average luminance value associated with the quadrant has been found to produce the most desirable results.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

For example, the communication path 114 (FIG. 1) may take many forms. As stated above, it may be parallel or serial or a combination of the two. In particular, it may take the form of a network interface and the network may be any of a variety of types such as ring or star, master/slave or peer etc. Also, the chrominance compression scheme could be recursive, using successively smaller regions to meet the competing demands of image quality and image compression. It may also be used in conjunction with other data compression techniques, including both time domain and spatial domain techniques.

Although the disclosure herein contemplates the use of a programmed computer to perform the compression and decompression, specialized hardware can also be used. The compression can be done on either previously stored data or on a data stream by selectively delaying video information and using pipeline techniques.

Further, the regions and sub-regions need not be square regions and quadrants thereof as depicted in the drawing. However, the use of horizontal and vertical quadrants does allow an abrupt color change which occurs either pixel-to-pixel, line-to-line or on the diagonal to be easily detected. In addition, although abrupt color changes are depicted within the figures, this merely reflects a limitation of the medium used to describe the invention. It is not a limitation of the invention nor, generally, is it a limitation of the displays used in conjunction with the invention.

What is claimed is:

1. A method for compressing digital video information comprising a plurality of video chrominance signal values, each value representing a different area of a video image, the method comprising the steps of:

A. dividing the image to be compressed into non-overlapping quadrants, each quadrant containing a plurality of pixels each having one of a plurality of video chrominance signal values;

B. determining an average video chrominance signal value for each of the plurality of quadrants;

C. comparing the average video chrominance signal values for a subset of the plurality of quadrants comprising spatially contiguous quadrants;

D. assigning one encoded video chrominance signal value to each of the spatially contiguous quadrants in the subset when the difference between the average video chrominance signal values of each of the spatially contiguous quadrants in the subset differ by less than a threshold amount;

E. assigning individual video chrominance signal values to each of the spatially contiguous quadrants in the subset when the difference between the average video chrominance signal values of each of the spatially contiguous quadrants in the subset differ by more than the threshold amount; and F. forming a data stream containing the chrominance video signal values assigned in steps D and E; and G. inserting an escape flag in said data stream to indicate to a decoder the number of pixels which should be assigned a chrominance signal value which is subsequent to said escape flag.

2. The method of claim 1 wherein the one encoded video chrominance signal assigned in step D is the average of the average video chrominance signal values of each of the spatially contiguous quadrants.

3. The method of claim 2 wherein each of the individual video chrominance signal values assigned in step E is one of the average video chrominance signal values computed in step B.

4. The method of claim 3 wherein step B comprises the steps of:

B1. weighting the video chrominance signal values for the subset of the plurality of quadrants comprising spatially contiguous quadrants; and B2. determining the average video chrominance signal value using the weighted video chrominance signal values determined in step B1.

5. A variable spatial frequency encoding apparatus for compressing digital video information comprising a plurality of video chrominance signal values, each chrominance signal value representing a different area of a video image, the compressing apparatus comprising:

A. a mechanism for dividing the image to be compressed into non-overlapping quadrants, each quadrant containing a plurality of pixels each containing a video chrominance signal value;

B. apparatus responsive to the plurality of chrominance signal values in each quadrant for determining an average video chrominance signal value for each of the plurality of quadrants;

C. apparatus responsive to the average video chrominance signal values of a subset of the plurality of quadrants comprising spatially contiguous quadrants, for comparing the average video chrominance signal values for each of the spatially contiguous quadrants in the subset;

D. apparatus for assigning one encoded video chrominance signal value to all of the spatially contiguous quadrants in the subset when the average video chrominance signal values of all pairings of the spatially contiguous quadrants in the subset differ by less than a threshold amount, and for providing a compressed digital information data stream including the one encoded video chrominance signal value;

E. means for assigning individual video chrominance signal values to the compressed digital information data stream for each of the spatially contiguous quadrants in the subset when the average video chrominance signal values of any two of the spatially contiguous quadrants in the subset differ by more than the threshold amount; and F. means for inserting a first escape code into the compressed digital information data stream followed by the individual encoded video chrominance signal values when the average video chrominance signal values of any two of the spatially contiguous quadrants in the subset differ by more than the threshold amount.

6. The variable spatial frequency encoding apparatus of claim 5 further comprising G, second encoding apparatus for inserting a second escape code into the compressed digital information data stream followed by the individual encoded video chrominance signal values when the average video chrominance signal values within more than one group of the spatially contiguous quadrants differ by more than the threshold amount.

7. The variable spatial frequency encoding apparatus of claim 6 wherein the threshold amount comprises a value about midway between a first amount that produces maximum compression and a second amount which produces imperceptible video image degradation.

8. The method of claim 3 wherein the step of inserting escape flags in said data stream comprises the steps of:

G1. inserting a first escape flag to indicate that a fixed amount of subsequent chrominance data in the data stream has been assigned in accordance with step D; and G2. inserting a second escape flag to indicate that the subsequent chrominance data in the data stream has been assigned in accordance with step E.

9. The method of claim 8 wherein the step G2 of inserting a second escape flag in said data stream further comprises the steps of:

G3. again inserting a second escape flag to indicate that the subsequent chrominance data in the data stream is encoded in accordance with step D.

10. The method of claim 9 wherein step G2 of inserting said second escape flag indicates a transition in the data stream from data encoded in accordance with step D to data encoded according to step E, and wherein the step G3 of again inserting said second escape flag is used to indicate a transition in the data stream from data encoded according to step E to data encoded according to step D.

11. The variable spatial frequency encoding apparatus of claim 5 further comprising H. means for inserting a second escape code flag into the compressed digital information data stream to indicate that the subsequent encoded chrominance data in the compressed digital information data stream is individual video chrominance signal values, and for again inserting a second escape code flag into the compressed digital information data stream to indicate that the subsequent data in the compressed digital information data stream is the one encoded video chrominance signal value.

12. A variable spatial frequency encoding apparatus for compressing digital video information comprising a plurality of video chrominance signal values, each chrominance signal value representing a different area of a video image, the compressing apparatus comprising:

A. means for dividing the image to be compressed into non-overlapping quadrants, each quadrant containing a plurality of pixels each containing a video chrominance signal value;

B. means responsive to the plurality of chrominance signal values in each quadrant for determining an average video chrominance signal value for each of the plurality of quadrants;

C. means responsive to the average video chrominance signal values of a subset of the plurality of quadrants comprising spatially contiguous quadrants, for comparing the average video chrominance signal values for each of the spatially contiguous quadrants in the subset;

D. means for assigning one encoded video chrominance signal value to all of the spatially contiguous quadrants in the subset when the average video chrominance signal values of all pairings of the spatially contiguous quadrants in the subset differ by less than a threshold amount, and for providing a compressed digital information data stream including the one encoded video chrominance signal value;

E. means for assigning individual video chrominance signal values to the compressed digital information data stream for each of the spatially contiguous quadrants in the subset when the average video chrominance signal values of any two of the spatially contiguous quadrants in the subset differ by more than the threshold amount; and F. means for inserting a first escape code into the compressed digital information data stream followed by the individual encoded video chrominance signal values when the average video chrominance signal values of any two of the spatially contiguous quadrants in the subset differ by more than the threshold amount.

13. The variable spatial frequency encoding apparatus of claim 12 further comprising G. second encoding means for inserting a second escape code into the compressed digital information data stream followed by the individual encoded video chrominance signal values when the average video chrominance signal values within more than one group of the spatially contiguous quadrants differ by more than the threshold amount.

* * * * *